United States Patent [19]

Kubo et al.

[11] Patent Number: 5,155,641
[45] Date of Patent: Oct. 13, 1992

[54] HELICAL SCAN MAGNETIC TAPE RECORDING APPARATUS FOR REFORMING READ-AFTER-WRITE STORAGE OF MANUFACTURING ROTARY HEAD USED THEREIN

[75] Inventors: Toshimitsu Kubo; Yukihiko Haikawa, both of Higashihiroshima, Japan

[73] Assignee: Sharp Kabushiki Kaisha, Osaka, Japan

[21] Appl. No.: 573,801

[22] Filed: Aug. 28, 1990

[30] Foreign Application Priority Data

Aug. 28, 1989 [JP] Japan ................. 1-221345

[51] Int. Cl.⁵ .................... G11B 5/53; G11B 21/18
[52] U.S. Cl. .................................... 360/107
[58] Field of Search ............... 360/107, 21, 31

[56] References Cited

FOREIGN PATENT DOCUMENTS 329395 8/1989 European Pat. Off. .

OTHER PUBLICATIONS

Patent Abs. of Japan, vol. 13, No. 475 (p. 950) Oct. 27, 1989 JP--01 185809 Sharp, Jul. 25, 1989.
Patent Abs. of Japan, vol. 13, No. 475 (p. 950) Oct. 27, 1989 JP-A-01 185808 Sanyo Electric Co. Jul. 25, 1989.
Patent Abs. of Japan, vol. 13, No. 511 (p. 961) Nov. 16, 1989 JP-A-01 208704 (Victor Co. of Japan Ltd.) Aug. 22, 1989.
Patent Abs. of Japan, vol. 13, No. 250 (p. 882) Jun. 12, 1989 JP-A-01 049102 (Matsushita Electric Inc. Co.) Feb. 23, 1989.

a

Primary Examiner—Robert S. Tupper
Attorney, Agent, or Firm—Nixon & Vanderhye

[57] ABSTRACT

A rotating drum (9) has first and second writing heads (W1 and W2) and first and second reproducing heads (R1 and R2) mounted on its peripheral surfaces. The respective magnetic heads are arranged at predetermined intervals in the circumferential direction of the rotating head (9) to meet predetermined angle conditions. When a writing operation by the first writing head (W1) is completed, a writing operation by the second writing head (W2) followed. Subsequently, the first reproducing head (R1) reproduces the contents written by the first writing head (W1) and then the second reproducing head (R1) reproduces the contents written by the second writing head (W2). Such one cycle of read-after-write operation is performed while the rotating drum rotates n times (n is integer equal to or larger than 2). Thus, timings of the writing and reading operations by the respective heads do not overlap with each other. As a result, generation of crosstalk can be prevented.

8 Claims, 7 Drawing Sheets

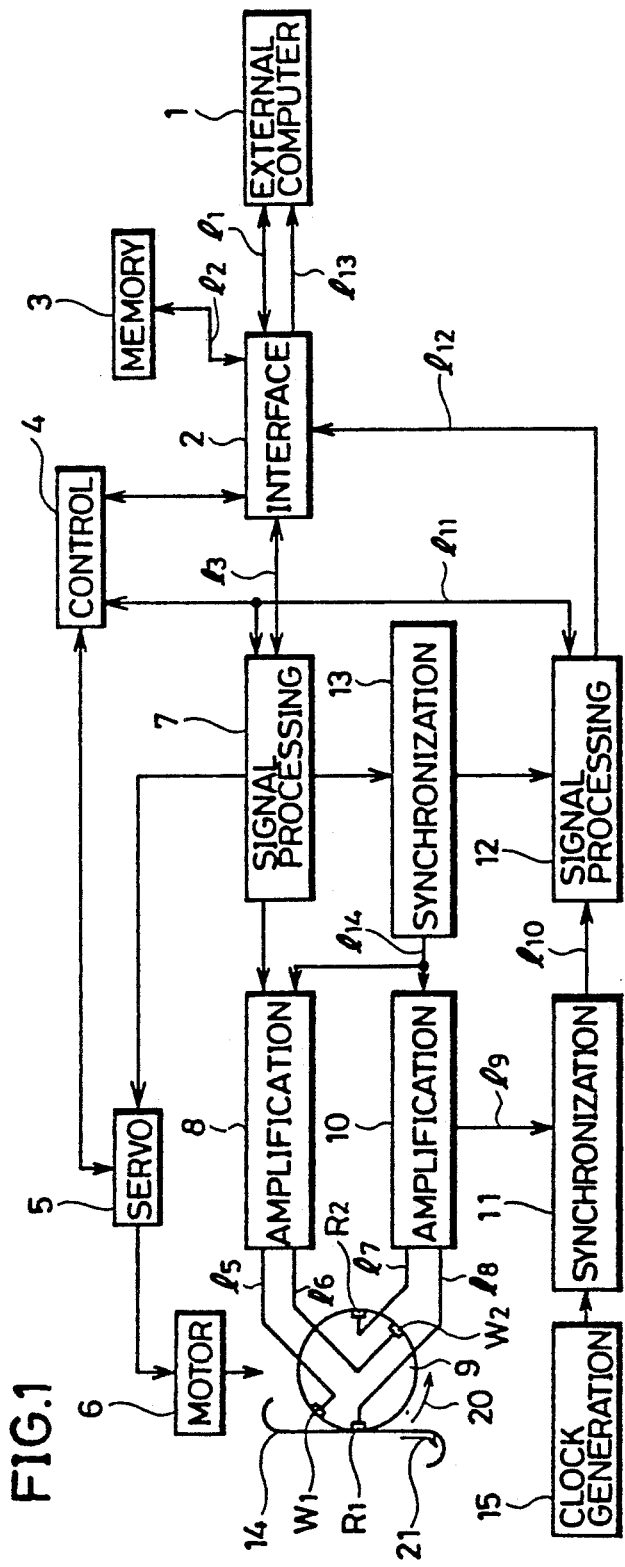

HELICAL SCAN MAGNETIC TAPE RECORDING APPARATUS FOR REFORMING READ-AFTER-WRITE STORAGE OF MANUFACTURING ROTARY HEAD USED THEREIN

CROSS-REFERENCE TO RELATED APPLICATION

This application is related to copending application Ser. No. 470,150, filed Jan. 25, 1990, commonly assigned with the present invention.

BACKGROUND OF THE INVENTION

1. Field of the Invention

The present invention generally relates to recording apparatuses of helical scan type, and more particularly, to a rotary head-type magnetic recording apparatus such as rotary head-type digital audio tape recorder (referred to as R-DAT hereinafter), and to a manufacturing method of a rotary head used therein.

2. Description of the Background Art

FIG. 8 is a plan view showing structure of a rotating drum 31 in a conventional R-DAT. The rotating drum 31 has two writing heads 32a and 32b mounted thereon 180° apart from each other. The two writing heads 32a and 32b are set to have azimuth angles of +20° and −20°, respectively. Also, the rotating drum 31 is provided with two reproducing heads 33a and 33b spaced 180° apart from each other. The azimuth angles of the two reproducing heads 33a and 33b are also set to be +20° and −20°, respectively. The four heads above are arranged to be spaced 90° apart from one another. The rotating drum 31 has diameter D1 of 30 mm and has a magnetic tape 34 contacted thereon with the support of two guide pins 35 and 36. The contact angle of this magnetic tape 34 to the rotating drum 31 is set to 90°. With such a structure, the rotating drum 31 rotates in the direction of arrow 37, while recording on or reproducing from the magnetic tape 34 which is run in the direction of arrow 38.

When an R-DAT is used as an auxiliary storage apparatus of a computer or the like, a read-after-write operation is performed in order to enhance reliability of the data being recorded. That is, immediately after a recording, the recorded data is read out to examine whether or not the data has been correctly recorded.

FIG. 9 is a timing chart showing the read-after-write operation in the structure shown in FIG. 8. Since writing heads 32a and 32b and corresponding reproducing heads 33a and 33b are arranged to be spaced 90° apart from one another and also the contact angle of magnetic tape 34 to rotating drum 31 is 90°, a reading operation is performed immediately after a writing operation is completed.

In order to make the above-described structure of R-DAT compact, it has been proposed to make the diameter of rotating drum 31 smaller. FIG. 10 is a plan view showing another structure of rotating drum 31, where diameter D4 is 20 mm. In FIG. 10, the parts corresponding to those in FIG. 8 are designated by the same reference numerals. The reduction of 10 mm in diameter of rotating drum 31 necessitates also a reduction of 135° in the contact angle of magnetic tape 34 to rotating drum 31.

FIG. 11 is a timing chart showing the read-after-write operation in the structure shown in FIG. 10. Though writing heads 32a and 32b and corresponding reproducing heads 33a and 33b are arranged to be spaced 90° apart from one another, the writing operation and the reading operation have to be performed partially during the same periods due to the contact angle 135° of magnetic tape 34 to rotating drum 31. As a result, there arises a problem of crosstalk defined as the transfer of a writing signal into the reading operation.

SUMMARY OF THE INVENTION

An object of the present invention is to provide a magnetic tape recording apparatus of helical scan type which can solve the technical problem described above so that crosstalk is not generated even when a rotating drum of a small diameter is employed, and a manufacturing method of a rotary head used therein.

According to the present invention, a rotating drum, which has first and second writing heads and first and second reproducing heads mounted on its peripheral surfaces at predetermined intervals and a magnetic tape contacted on its peripheral surface with a predetermined angle in the circumferential direction, writes with the writing heads on the magnetic tape and immediately thereafter, reproduces with the reproducing heads the contents written in the magnetic tape. Assuming that a horizontal angle spanned between the first and second writing heads with respect to the rotation axis of the rotating drum is $\theta 1$, that angle spanned alike between the second writing head and the first reproducing head is $\theta 2$, that angle spanned alike between the first and second reproducing heads is $\theta 3$, a contact angle of the magnetic tape to the rotating drum is $\alpha$, and the rotation number of the rotating drum in one cycle of recording operation is n (n is integer equal to or larger than 2), the first and second writing heads and the first and second reproducing heads are mounted on the peripheral surfaces of the rotating drum to meet the following conditions.

$$\alpha \leq \theta 1, \alpha \leq \theta 2, \alpha \leq \theta 3$$

$$\theta 1 + \theta 2 + \theta 3 \leq 360° \times n - \alpha.$$

$$\theta 1 = \theta 3 = 180°$$

$$90° < \alpha \leq 180°$$

$$\theta 2 \leq 360° \times (n-1) - \alpha.$$

In the present invention, one cycle of recording operation is performed during a period in which the rotating drum rotates n (n is integer equal to or larger than 2) times. The one cycle of recording operation includes writing operations by the first and second writing heads on the magnetic tape and reproducing operations that are performed immediately after the writing operations by the first and second reproducing heads, respectively, to reproduce the written contents. When a writing operation by the first writing head is completed, another writing operation by the second writing head follows. Subsequently, the first reproducing head reproduces the contents written by the first writing head and thereafter, the second reproducing head reproduces the contents written by the second writing head. In this case, the angle $\theta 2$ between the second writing head and the first reproducing head is equal to or larger than the contact angle $\alpha$ of the magnetic tape. Further, reproduction by the second reproducing head is completed by the completion of one cycle of recording operation has when the rotating drum has rotated n times. Accordingly, the generation of crosstalk can be prevented.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing basic structure of an R-DAT according to an embodiment of the present invention.

FIG. 2 is a plan view of rotating drum 9 shown in FIG. 1.

DESCRIPTION OF THE PREFERRED EMBODIMENT

FIG. 1 is a block diagram showing the basic structure of a rotary head-type digital audio tape recorder (referred to as R-DAT hereinafter) according to an embodiment of the present invention. FIG. 2 is a plan view showing a structure of rotating drum 9 in the R-DAT shown in FIG. 1.

In this embodiment, the R-DAT may be used as an auxiliary storage apparatus of an external computer 1. In FIG. 1, when data from external computer 1 are to be written on a magnetic tape 14, they are applied to an interface 2 through a line 11. The data on line 11 may include picture information, voice information, information to be processed in external computer 1, and the like, and are transmitted typically in information units (referred to as "frames" hereinafter) each corresponding to two tracks on magnetic tape 14, as will be described later. One frame contains, for example, data of 5120 bytes and data are divided into frames in external computer 1 for output.

Figure 8:
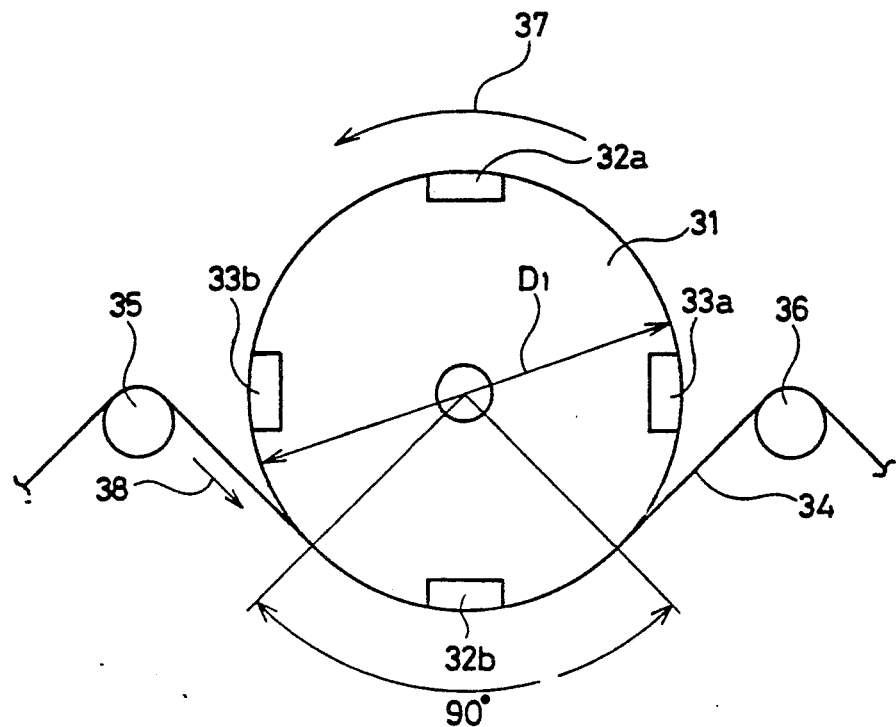
FIG. 8 is a diagram showing a structure of rotating drum in a conventional R-DAT.
Figure 9:
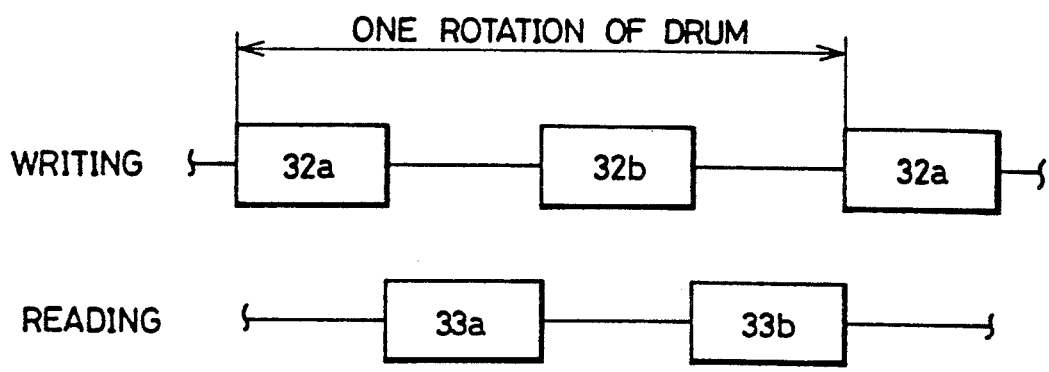
FIG. 9 is a timing chart for explaining operation of the rotating drum shown in FIG. 8.
Figure 10:
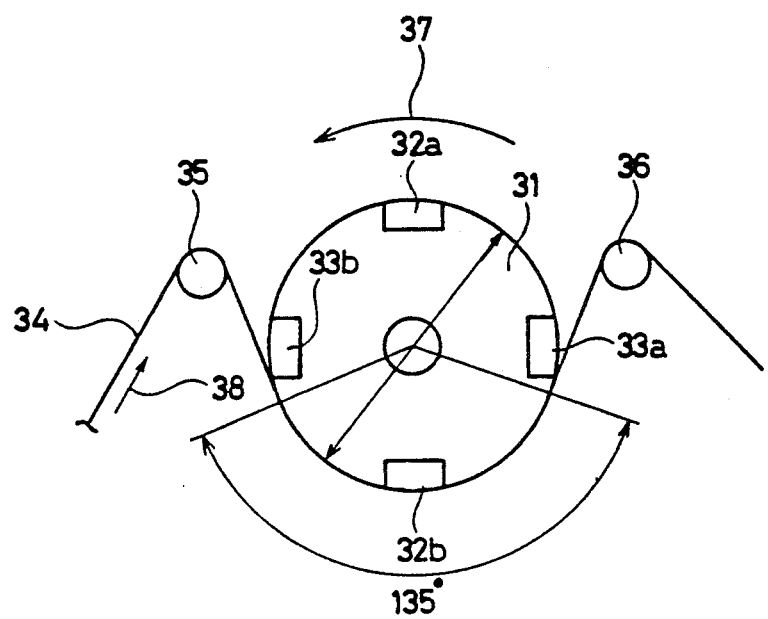
FIG. 10 is a diagram showing another structure of rotating drum in a conventional R-DAT.
Figure 11:
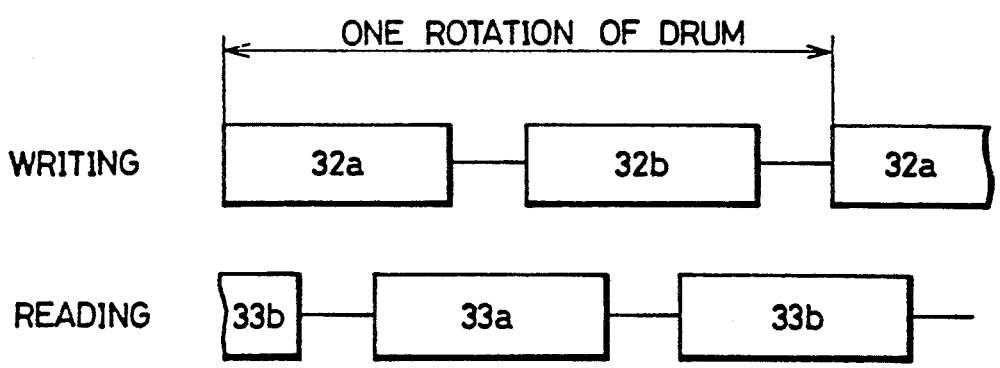
FIG. 11 is a timing chart for explaining operation of the rotating drum shown in FIG. 10.

FIG. 2 is a diagram showing an arrangement of first and second writing heads W1 and W2 and first and second reproducing heads R1 and R2 on rotating drum 9 in the R-DAT shown in FIG. 1. The rotating drum 9 has been adapted to have a smaller diameter than diameter D1 (for example, 30 mm) of the rotating drum 31 in the conventional R-DAT shown in FIG. 8. Accordingly, the contact angle $\alpha$ of the magnetic tape 14 to rotating drum 9 has become larger than the 90° contact angle of the magnetic tape 34 shown in FIG. 8. Assuming that the contact angle of a magnetic tape to a rotating drum of a 30 mm diameter is 90°, the contact angle $\alpha$ of a magnetic tape to a rotating drum of a $\times$ mm diameter is represented by the following expression.

$$\alpha = 90° \times (30/x) \tag{1}$$

For example, if $x = 20$ mm, then the contact angle $\alpha$ is 135°.

As described above, if rotating drum 9 has a small diameter, the contact angle of magnetic tape 14 to rotating drum 9 becomes 90° or larger. Therefore, if writing and reading are to be done by for example four magnetic heads during a single rotation of rotating drum 9, there will arise overlaps between writing periods and reading periods, causing crosstalk. Consequently, according to the present embodiment, writing by writing heads W1 and W2, and reading by reading heads R1 and R2 are performed during two rotations of rotating drum 9. For this purpose, the respective magnetic heads are arranged as shown in FIG. 2.

In FIG. 2, assuming that horizontal angles spanned between first and second writing heads W1 and W2 with respect to the central axis of rotating drum 9 is $\theta_1$, that horizontal angle spanned between second writing head W2 and first reproducing head R1 is $\theta_2$, and that horizontal angle spanned between first and second reproducing heads R1 and R2 is $\theta_3$, the respective magnetic heads are arranged to meet the following conditions.

$$\alpha \leq \theta_1 \tag{2}$$

$$\alpha \leq \theta_2 \tag{3}$$

$$\alpha \leq \theta_3 \tag{4}$$

$$\theta_1 + \theta_2 + \theta_3 \leq 720° - \alpha \tag{5}$$

$$\theta_1 = \theta_3 = 180° \tag{6}$$

Figure 3:
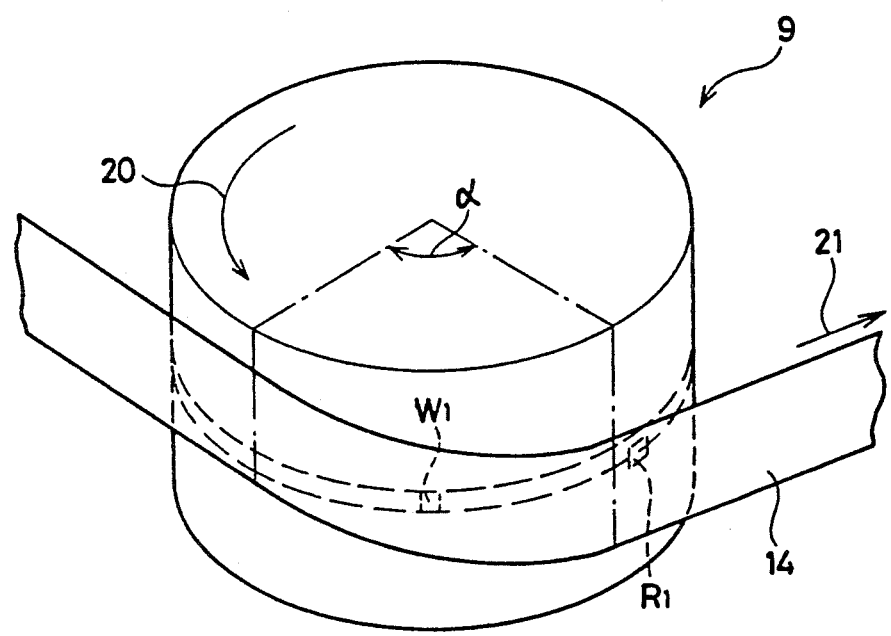
FIG. 3 is a perspective view of rotating drum 9 shown in FIG. 1.

FIG. 3 is a perspective view showing a structure of rotating drum 9 and other parts associated therewith. Rotating drum 9 is driven by a motor 6 to rotate in the direction indicated by arrow 20. At this time, a servo circuit 5 controls the rotating speed of motor 6 according to a control signal from a control circuit 4. Further, magnetic tape 14 is run by a capstan motor (not shown) or the like in the direction indicated by arrow 21. Magnetic tape 14 contacts a side surface of rotating drum 9 through an angle $\alpha$. Angle $\alpha$ is, for example, 135°.

First and second writing heads W1 and W2 are provided on a diameter line at side surfaces of rotating drum 9. Similarly, first and second reproducing heads R1 and R2 are also provided on a diameter line at side surfaces of rotating drum 9. First and second writing heads W1 and W2 have corresponding first and second reproducing heads R1 and R2 are provided slightly displaced from each other in the axial direction as illustrated in FIG. 3 for W1, R1.

Figure 4:
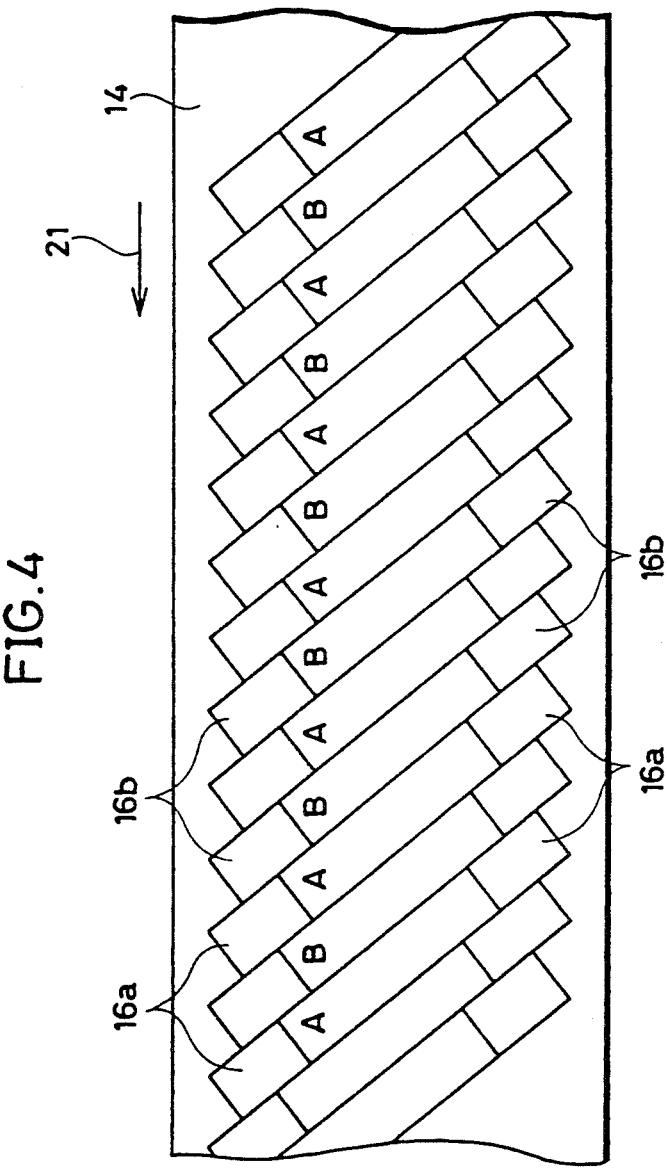
FIG. 4 is a diagram showing a track pattern on magnetic tape 14.

Such first and second writing heads W1 and W2 scan on magnetic tape 14 in a diagonal direction as shown in FIG. 4, forming tracks A and B, respectively. Frame numbers as will described later are recorded on parts of sub-code areas 16a and 16b.

Figure 5:
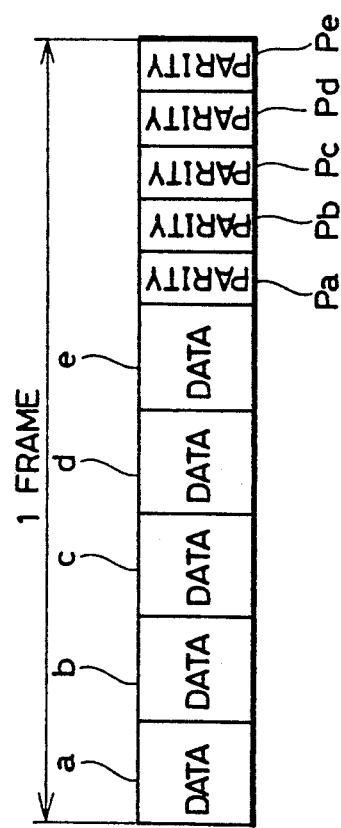
FIG. 5 is a diagram showing composition of one-frame data employed in an R-DAT.

In the R-DAT shown in FIG. 1, one frame is divided into a plurality of areas as shown in FIG. 5. More specifically, for example, one frame comprises five data areas a to e and parity areas Pa to Pe individually corresponding to the data areas a to e. The above-mentioned data of 5120 bytes are divided into the data areas a to e each containing a data amount of 1024 bytes.

Parity areas Pa to Pe each contain, for example, data of 128 bytes, which individually correspond to the data in data areas a to e. The data in these parity areas Pa to Pe are added at interface 2 for use as error correcting codes. While in the R-DAT, parity addition is further performed in a signal processing circuit 7 as will be described later, the one-frame composition shown in FIG. 5 ensures further enhanced reliability of the R-DAT as an auxiliary storage apparatus.

Figure 6:
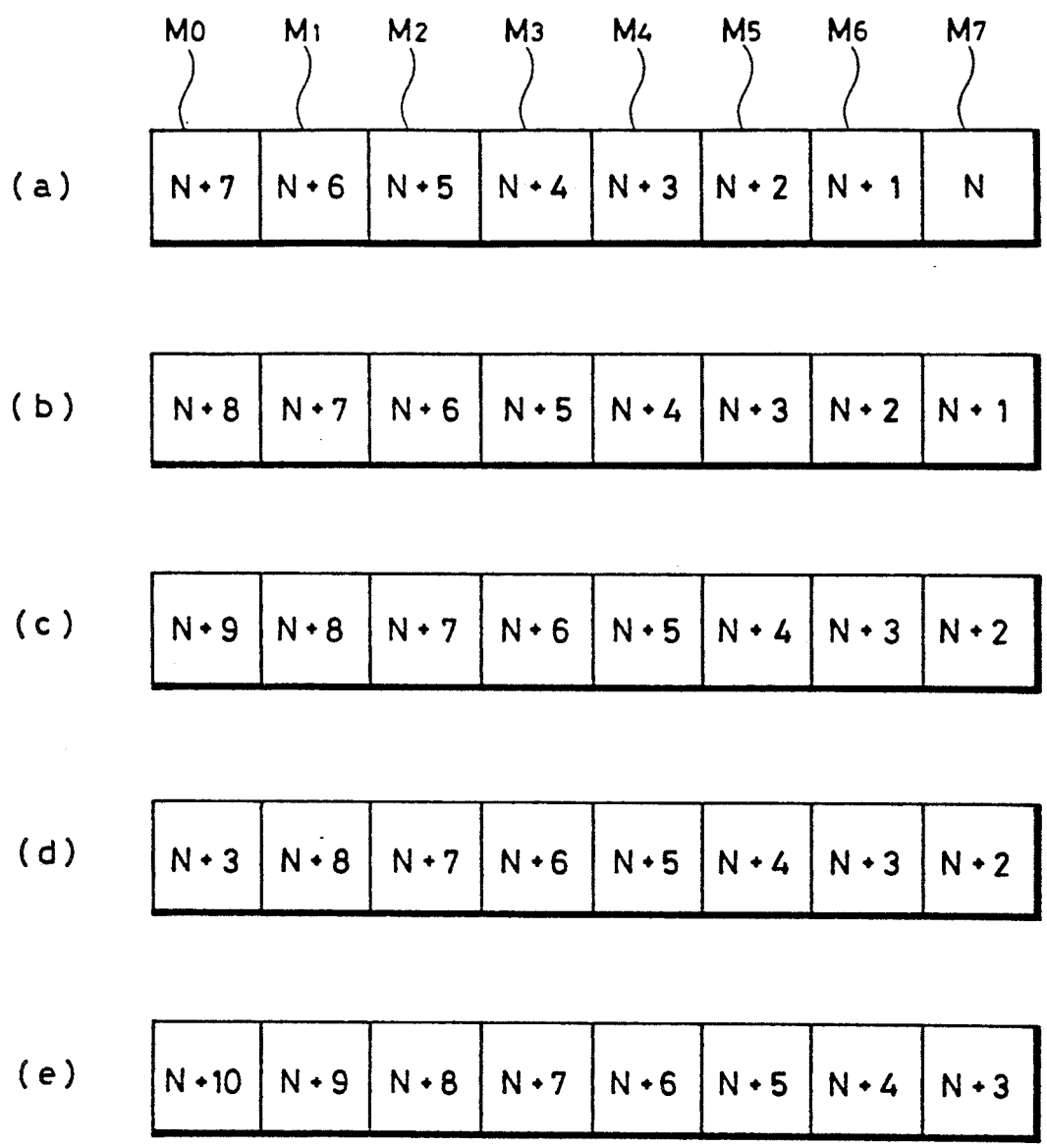
FIG. 6 is a diagram showing operation of memory 3 shown in FIG. 1.

Such data is output from interface 2 to signal processing circuit 7 through a line 13 as well as to memory 3 such as random access memory through a line 12. Memory 3 is divided into eight memory areas M0 to M7 as shown in FIG. 6, each of which stores data of one frame.

In memory 3, data of one frame from interface 2 is first stored in memory area M0. At this time, the respective data having been stored in memory areas M0 to M6 are sequentially transmitted to the following write-hand memory areas M1 to M7. The data having been stored in memory area M7 is generally deleted. For example, referring to FIG. 6(a), where data of frame numbers N+7 to N as will described later have been stored in memory areas M0 to M7, respectively, when data of frame numbers N+8 and N+9 are sequentially entered, memory 3 changes its stored state as shown in FIGS. 6(b) and 6(c). Input/output operation or the like at interface 2 is performed according to a control signal from control circuit 4 which may be, for example, a microcomputer.

The parity addition in a general R-DAT is performed on the data which have been taken in signal processing circuit 7 from interface 2 through line 13. The data with the added parity is output to an amplifier 8 through a line 14. A data signal which has been amplified by amplifier 8 is applied to first writing head W1 through a line 15 or switched to be applied to second writing head W2 through a line 16, and then written in magnetic tape 14. The switching at amplifier 8 is controlled by a signal from a synchronizing circuit 13 which has been synchronized with rotation of rotating drum 9.

The data having been written in magnetic tape 14 are read out by first and second reproducing heads R1 and R2 which correspond to first and second writing heads W1 and W2, respectively. Signals from first and second reading heads R1 and R2 are applied to another amplifier 10 through lines 17 and 18, respectively. At this time, first and second reproducing heads R1 and R2 read out data on the tracks A and B, respectively, which have been formed by the corresponding first and second writing heads W1 and W2.

The data signal which has been amplified by amplifier 10 is output to synchronizing circuit 11 through a line 19, where it is synchronized with a clock signal from a clock generating circuit 15. Meanwhile, amplifier 10 switches, according to a synchronizing signal from synchronizing circuit 13, outputs from first and second reproducing heads R1 and R2 for output to line 19. Output of synchronizing circuit 11 is transmitted to a signal processing circuit 12 through a line 110, where error correction of data, or the like is performed. The error correction is performed based on the parity which has been added to the data in signal processing circuit 7. The signal processing such as error correction at this stage is synchronized by synchronizing circuit 13 with that in signal processing circuit 7 including the parity addition or the like.

The data output from signal processing circuit 12 is applied to the above-mentioned interface 2 through a line 112. Generally, interface 2 stores memory 3 with data through line 12 and thereafter, reads out the data from memory 3 for output to external computer 1.

Figure 7:
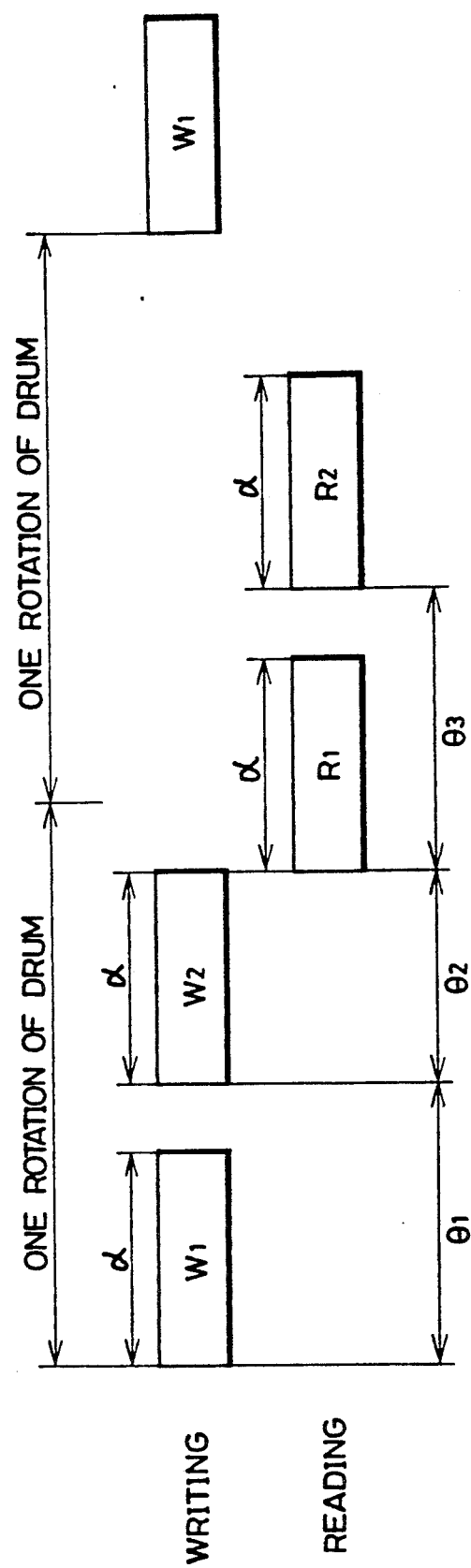
FIG. 7 is a timing chart showing a recording operation by the R-DAT shown in FIG. 1.

FIG. 7 is a timing chart showing a recording operation in the R-DAT shown in FIG. 1. As shown in FIG. 7, there is no overlap between the writing periods of first and second writing heads W1 and W2 and the reading periods of first and second reproducing heads R1 and R2. Therefore, the crosstalk which occurs in the conventional R-DAT is prevented.

In the present embodiment, since the operation which has been performed with a single rotation of the rotating drum is done with two rotations of the same, an unchanged read angle of magnetic tape 14 to rotating drum 9 will cause a minor change in the track angle on magnetic tape 14. Therefore, in order to enable scanning on tracks with the conventional track angle unchanged, the read angle may be changed in providing magnetic tape 14 on rotating drum 9.

As described above, according to the present embodiment, since in the read-after-write operation of recording, a reading operation is performed after a writing operation is completed, generation of the crosstalk is prevented, even when a small rotating drum is employed. Further, since first and second writing heads W1 and W2 cannot simultaneously contact with magnetic tape 14, they can share one rotary transformer for common use. Therefore, only a single rotary transformer is required. Additionally, since first and second writing heads W1 and W2 and also first and second reproducing heads R1 and R2 are each arranged symmetrically about the rotation axis of rotating drum 9, mounting and adjustment of those heads on rotating drum 9 can be easily done.

While in the present embodiment, a writing operation by first and second writing heads W1 and W2, and a reproducing operation by first and second reproducing heads R1 and R2 are performed during two rotations of rotating drum 9, they may be done by the respective magnetic heads during three or more rotations of rotating drum 9. In such a case, arrangement conditions for the respective magnetic heads will be as follows;

$$\alpha \leq \theta 1 \tag{7}$$

$$\alpha \leq \theta 2 \tag{8}$$

$$\alpha \leq \theta 3 \tag{9}$$

$$\theta + \theta 2 + \theta 3 \leq 360° \times n - \alpha \tag{10}$$

$$\theta 1 - \theta 3 = 180°, \tag{11}$$

where n represents the rotation number of rotating drum 9 in one cycle of the read-after-write operation (n is integer equal to or larger than 3).

While the embodiment above has been described in connection with the case that the present invention is applied to an R-DAT, the present invention is also applicable to other magnetic recording apparatuses such as VCR (Video Cassette Recorder).

As has been described above, according to the present invention, since in the read-after-write operation of recording, a reading operation can be performed after a writing operation is completed, generation of the crosstalk is prevented, even when a small rotating drum is employed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A helical scan magnetic tape recording apparatus comprising:
   a rotating drum having first and second writing heads and first and second reproducing heads mounted on a peripheral surface of the drum at predetermined intervals,
   a magnetic tape contacting the circumferential drum surface at a predetermined angle, and wherein said drum writes on the magnetic tape with a writing head and immediately thereafter reproduces the written contents with a reproducing head, and
   wherein a horizontal angle between said first and second writing heads with respect to the rotation axis of said rotating drum is $\theta 1$, a horizontal angle between said second writing head and said first reproducing head with respect to the rotation axis of said rotating drum is $\theta 2$, a horizontal angle between said first and second reproducing heads with respect to the rotation axis of said rotating drum is $\theta 3$, an angle of contact of said magnetic tape to said rotating drum is $\alpha$, and a number of rotations of said rotating drum in one cycle of recording operation is n, n being an integer equal to or larger than 2, such that the following conditions are met:

$$\theta 1 = \theta 3 = 180°$$

$$90° < \alpha \leq 180°$$

$$\theta 2 \leq 360° \times (n-1) - \alpha.$$

2. The magnetic tape recording apparatus of helical scan type according to claim 1, wherein
   the diameter of said rotating drum is approximately 20 mm.

3. The magnetic tape recording apparatus of helical scan type according to claim 1,
   wherein said magnetic tape recording apparatus is a digital audio tape recorder for digitally recording signals on said magnetic tape.

4. The magnetic tape recording apparatus according to claim 1, wherein crosstalk between said heads is substantially eliminated.

5. The magnetic tape recording apparatus according to claim 1, wherein writing by said writing heads and reading by said reproducing heads are performed during two rotations of said drum.

6. The magnetic tape recording apparatus according to claim 1, wherein said first reproducing head is displaced axially along said drum rotation axis from said second reproducing head and said first writing head is axially displaced along said drum rotation axis from said second writing head.

7. The magnetic tape recording apparatus according to claim 1, wherein writing periods of said first and second writing heads do not overlap reading periods of said first and second reproducing heads.

8. A method for manufacturing a rotary head used in a helical scan magnetic tape recording apparatus for writing on a magnetic tape and immediately reproducing the written contents, comprising the steps of:
   providing a rotating drum;
   providing first and second writing heads and first and second reproducing heads; and
   mounting said first and second writing heads and said first and second reproducing heads on peripheral surfaces of said rotating drum to meet the following conditions:

$$\theta 1 = \theta 3 = 180°$$

$$90° < \alpha \leq 180°$$

$$\theta 2 \leq 360° \times (n-1) - \alpha.$$

where $\theta 1$ is a horizontal angle between said first and second writing heads with respect to the rotation axis of said rotating drum, $\theta 2$ is a horizontal angle between said second writing head and said first reproducing head, $\theta 3$ is a horizontal angle between said first and second reproducing heads with respect to the rotation axis of said rotating drum, $\alpha$ is a contact angle of said magnetic tape to said rotating drum, and n is the number of rotations of said rotating drum during one recording cycle, n being an integer equal to or larger than 2.

* * * * *